(12) United States Patent
Choi et al.

(10) Patent No.: US 7,411,551 B2
(45) Date of Patent: Aug. 12, 2008

(54) SYSTEM AND METHOD FOR ASYNCHRONOUS WIRELESS POSITIONING BY ORDERED TRANSMISSION

(75) Inventors: Sungsoo Choi, Seongnam-si (KR); Hui-Myung Oh, Seoul (KR); Kwan-Ho Kim, Seoul (KR); Yoan Shin, Seoul (KR); Won Cheol Lee, Seoul (KR); Woon-Yong Park, Seoul (KR); Youngjin Park, Anyang (KR)

(73) Assignee: Korea Electrotechnology Research Institute, Gyeongsangnam-Do (KR)

(*) Notice: Subject to any disclaimer, the term of this patent is extended or adjusted under 35 U.S.C. 154(b) by 251 days.

(21) Appl. No.: 11/025,821

(22) Filed: Dec. 28, 2004

(65) Prior Publication Data

US 2005/0282558 A1    Dec. 22, 2005

(30) Foreign Application Priority Data

Jun. 21, 2004    (KR)    ............ 10-2004-0046217

(51) Int. Cl.
*G01S 3/02* (2006.01)
*G01S 3/28* (2006.01)
*G01S 1/24* (2006.01)

(52) U.S. Cl. .................. 342/465; 342/378; 342/387

(58) Field of Classification Search ............... 455/456.1, 455/41.2; 342/387, 463, 398, 450, 385, 143, 342/423, 458
See application file for complete search history.

(56) References Cited

U.S. PATENT DOCUMENTS

| | | | | |
|---|---|---|---|---|
| 5,208,756 A | * | 5/1993 | Song ........................ | 455/456.3 |
| 5,216,429 A | | 6/1993 | Nakagawa et al. | |
| 5,309,428 A | * | 5/1994 | Copley et al. ............... | 370/245 |
| 5,363,109 A | * | 11/1994 | Hofgen et al. ............... | 342/31 |
| 5,589,838 A | | 12/1996 | McEwan | |
| 5,596,313 A | * | 1/1997 | Berglund et al. ............. | 340/574 |
| 5,719,584 A | * | 2/1998 | Otto ............................ | 342/465 |
| 5,945,948 A | * | 8/1999 | Buford et al. ............... | 342/457 |
| 6,002,708 A | * | 12/1999 | Fleming et al. ............. | 375/130 |
| 6,054,950 A | | 4/2000 | Fontana | |
| 6,300,904 B1 | * | 10/2001 | Dvorak et al. ............... | 342/457 |
| 6,483,461 B1 | * | 11/2002 | Matheney et al. ........... | 342/463 |
| 6,539,229 B1 | * | 3/2003 | Ali ........................... | 455/456.1 |
| 6,556,942 B1 | * | 4/2003 | Smith ......................... | 702/150 |
| 6,861,982 B2 | * | 3/2005 | Forstrom et al. ............ | 342/387 |
| 6,862,272 B2 | * | 3/2005 | Dulin et al. ................. | 370/330 |
| 6,876,326 B2 | * | 4/2005 | Martorana ................... | 342/463 |
| 6,900,753 B2 | * | 5/2005 | Tsunehara et al. ............ | 342/47 |

(Continued)

*Primary Examiner*—Thomas H. Tarcza
*Assistant Examiner*—Harry Liu
(74) *Attorney, Agent, or Firm*—The Webb Law Firm

(57) ABSTRACT

Disclosed is a wireless positioning system and method that can perform a high-precision position tracking. The wireless positioning system includes a target device that is an object of wireless positioning, beacon devices and a processing unit. The beacon devices transmits wireless signals and sense reception time points of the wireless signals transmitted from the other beacon devices and the target device and received at time points after the transmission of the wireless signal. The target device receives the wireless signal transmitted from at least one of the beacon devices, and then transmits the wireless signal to the beacon devices. The processing unit obtains the position of the target device by calculating distances between the beacon devices and the target device using information about the reception time points of the wireless signals sensed by the respective beacon devices.

12 Claims, 14 Drawing Sheets

U.S. PATENT DOCUMENTS

| | | | |
|---|---|---|---|
| 7,133,398 B2 * | 11/2006 | Allen et al. | 370/350 |
| 2002/0155845 A1 * | 10/2002 | Martorana | 455/456 |
| 2002/0171586 A1 * | 11/2002 | Martorana et al. | 342/458 |
| 2003/0092448 A1 * | 5/2003 | Forstrom et al. | 455/456 |
| 2003/0152059 A1 * | 8/2003 | Odman | 370/338 |
| 2003/0185170 A1 * | 10/2003 | Allen et al. | 370/329 |
| 2004/0008729 A1 * | 1/2004 | Rogerson et al. | 370/478 |
| 2004/0012524 A1 * | 1/2004 | Couronne et al. | 342/387 |
| 2005/0017894 A1 * | 1/2005 | Fullerton | 342/118 |
| 2005/0035897 A1 * | 2/2005 | Perl et al. | 342/29 |
| 2005/0036475 A1 * | 2/2005 | Nishiyama et al. | 370/347 |
| 2005/0147112 A1 * | 7/2005 | Sugaya | 370/418 |
| 2005/0227615 A1 * | 10/2005 | Sakoda | 455/7 |
| 2005/0233789 A1 * | 10/2005 | Maekawa | 463/1 |

* cited by examiner

SYSTEM AND METHOD FOR ASYNCHRONOUS WIRELESS POSITIONING BY ORDERED TRANSMISSION

BACKGROUND OF THE INVENTION

1. Field of the Invention

The present invention relates generally to wireless positioning techniques, and more particularly to a system and method for determining the position of a target device by ordered transmission of wireless signals even without distance information and pre-synchronization among beacon devices. The beacon device is a device which is the basis of determining the position of the target device and the position of which is previously known before the process of determining the poison of the target device is performed.

2. Description of the Prior Art

Recently, as the advantages of UWB (Ultra Wideband) wireless technologies are being watched, researches for short-distance high-precision wireless positioning systems have actively been in progress as one of applications of UWB pulses having extremely short durations.

Because the UWB pulses have the extremely short durations below nanosecond, they have been applied to the positioning systems so as to achieve a high-precision wireless positioning at centimeter levels, which could not be obtained through the existing communication systems. Additionally, the UWB pulses have extremely low power levels through the ultra wideband, and thus they can remove interference with other electronic appliances.

The existing wireless positioning techniques disclosed in U.S. Pat. Nos. 5,589,838 and 5,216,429 require pre-synchronization among beacon devices. Because in the prior art, the precision of positioning determined by the time resolution is generally at levels of about several tens of meters, it is possible that the systems operate in a range over which errors occurring in a process of synchronization among the beacon devices do not greatly damage the precision of positioning.

However, in the currently required systems of a high precision, e.g., having time resolutions below nanosecond, PLL (Phase Lock Loop) adjustment errors for obtaining the time synchronization, wired signal transfer errors, etc., become greater than the pulse durations if the systems are constructed so that they require the time synchronization among the beacon devices as in the prior art. This causes severe problems due to the synchronization errors when links among the beacon devices for the synchronization are made through not only wireless paths but also wire paths.

As a consequence, if the existing systems are applied as they are, it becomes impossible to achieve a high-precision positioning that makes the best use of the advantages of the UWB pulses having the extremely short durations.

In addition, U.S. Pat. No. 6,054,950 describes methods for determining the position of a target device using previously known coordinates of beacon devices without the necessity of data transmission/reception through wire connections among the beacon devices or pre-synchronization. One of the proposed methods is a method for synchronizing the respective beacon devices using GPS. However, because this method requires a GPS receiver, etc., (provided in the respective beacon device) the system is complicated and thus it is difficult to put the method to practical use. Additionally, because the system using the GPS has limited precision of time synchronization, it is impossible to achieve the wireless positioning of high precision below several meters through this method.

According to another of the proposed methods, the second beacon device and the target device receive the first pulse generated from the first beacon device, and the second beacon device successively transmits the first pulse to the third beacon device and the target device. This process is repeated up to the N-th beacon device, and the position of the target device is calculated using the distances among the beacon devices calculated using the differences among arrival times of the respective pulses received by the target device and the previously known coordinates of the beacon devices.

However, this method has the problems in that because the target device should serve as a signal receiver and processor, the structure of the target device becomes very complicated, and thus the application of this method is limited. Additionally, in order to perform the precise positioning of the target device by applying this method, the assumption that the distances among the beacon devices calculated using the previously known coordinates of the beacon devices are the same as the lengths of the actual wave propagation paths among the beacon devices should be satisfied. However, this assumption may not be satisfied because the actual wave propagation paths may be complicated according to diverse environmental variables such as the curved surface of the earth and so on, and thus the synchronization among the beacon devices is ultimately required in order to heighten the precision of positioning even though this method is used.

In addition, the target device (or tag) that is an object of the position tracking is generally a portable simplified individual device to which the power supply is not easy. For example, in order that the target device can widely be applied to various application fields from the personal portable communications adopting the short-distance wireless positioning system to the tags for logistics managements in RFID (Radio Frequency Identification) systems, it should generally be designed to have low power consumption. Although the UWB pulses have extremely low power levels, it is strongly necessary to develop a position tracking system that enables low-power operation using a target device of a simplified structure so that the number of operations and the number of signal transmissions performed in the target device can be minimized.

SUMMARY OF THE INVENTION

Accordingly, the present invention has been made to solve the above-mentioned problems occurring in the prior art, and an object of the present invention is to provide a wireless positioning system and method that can perform high-precision position tracking by minimizing errors through a proposed method for accurately obtaining indirect time synchronization without the necessity of time synchronization. In applying the present invention, the use of UWB pulses as wireless signals enables a high-precision position tracking that makes the best use of the advantages of the UWB-pulses.

Another object of the present invention is to provide a wireless positioning system and method that can use a target device of a simple structure without the necessity of a complicated operation process in the target device, perform low-power operation through simplification of the construction of the target device and minimization of the number of signal transmissions, and achieve a precise position tracking.

Still another object of the present invention is to provide a wireless positioning system and method that can perform a more accurate positioning by making it possible to detect a ToA (Time of Arrival) and a TDoA (Time Difference of Arrival) through the pulse transmission/reception even if the synchronization among beacon devices is not provided and the accurate distance information about the wave propagation paths is not known.

Still another object of the present invention is to provide a wireless positioning system and method that can be applied to networks of a star structure and a cluster-tree structure.

Still another object of the present invention is to provide a method and system that can achieve an accurate positioning even by low-power devices by dividing the whole system into small-scale sub-cluster areas and performing a wireless positioning using the devices existing in overlapping areas among the respective sub-cluster areas so that an asynchronous wireless positioning using the low-power devices becomes possible.

Still another object of the present invention is to provide a scheme for efficiently managing addresses of a target device and beacon devices in a transmitted signal to match diverse positioning modes so that the present invention can be applied to the WPAN (Wireless Personal Area Network) technology.

In order to accomplish the above and other objects, there is provided a wireless positioning system, according to a first aspect of the present invention, which includes a target device that is an object of wireless positioning, a plurality of beacon devices and a processing unit, (a) each of the beacon device having at least a wireless signal transmission module, a wireless signal reception module and a counter module, transmitting a wireless signal using the wireless signal transmission module, and sensing reception time points of wireless signals that are transmitted from the other beacon devices and the target device and received at time points after the transmission of the wireless signal using the counter module, (b) the target device having at least a wireless signal transmission module and a wireless reception module, receiving the wireless signal transmitted from at least one of the plurality of beacon devices, and then transmitting the wireless signal to the plurality of beacon devices, and (c) the processing unit obtaining the position of the target device by calculating distances between the plurality of beacon devices and the target device using information about reception time points of the wireless signals sensed by the respective beacon devices.

Preferably, the plurality of beacon devices include at least a first beacon device for transmitting a first wireless signal and a second beacon device for transmitting a second wireless signal when a predetermined delay time elapses after the first wireless signal is received.

The plurality of beacon devices may further include a third beacon device for transmitting a third wireless signal when the predetermined delay time elapses after the second wireless signal is received.

Further, the target device may transmit a fourth wireless signal when the predetermined delay time elapses after the third wireless signal is received.

Preferably, the first beacon device senses the reception time points of the second wireless signal, the third wireless signal and the fourth wireless signal.

It is preferable that the second beacon device senses the reception time points of the third wireless signal and the fourth wireless signal.

It is preferable that the third beacon device senses the reception time point of the fourth wireless signal.

Here, it is preferable that the predetermined delay time is a time enough for the reception of the received wireless signal through all the other beacon devices.

The wireless positioning system according to the present invention may further include a coordinator device that manages an address list for identifying the plurality of beacon devices, transmits a reference wireless signal for requesting the wireless positioning to at least one of the plurality of beacon devices, receives and transmits the information about the reception time points of the wireless signals sensed by the plurality of beacon devices to the processing unit.

In a second aspect of the present invention, there is provided a wireless positioning system for a specified area in which a plurality of devices that can transmit/receive wireless signals are distributed, which includes a coordinator device that manages an address list for identifying the plurality of devices, selects two or more devices among the plurality of devices the positions of which are previously known and which exist in a distance over which a wireless transmission/reception is possible, and transmits a reference wireless signal for requesting a wireless positioning of another device among the plurality of devices the position of which is to be known (i.e., which is an object of the positioning), each of the devices the positions of which are previously known having at least a wireless signal transmission module, a wireless signal reception module and a counter module, transmitting a wireless signal using the wireless signal transmission module, and sensing reception time points of wireless signals that are transmitted from the other devices and received at time points after the transmission of the wireless signal using the counter module, and the device that is the object of the positioning having at least a wireless signal transmission module and a wireless reception module, receiving the wireless signal transmitted from at least one of the devices the positions of which are previously known, and then transmitting the wireless signal to the devices the positions of which are previously known.

Here, the coordinator device and the plurality of devices may be constructed to have a star structure around the coordinator device or to have a cluster-tree structure composed of several clusters.

The device that is the object of the positioning may be located in a distance over which the wireless transmission/reception with the devices the positions of which are previously known is possible, but over which the wireless transmission/reception with the coordinator device is difficult, and through the device, the wide-area positioning becomes possible even if wireless transmission powers of the devices are not high.

Additionally, the devices (the positions of which are known in advance) may include first to fourth devices. The device that is the object of the positioning may be able to perform a three-dimensional wireless positioning by making the fourth device detect a height of the device that is the object of the positioning.

Additionally, in order to improve the precision of the wireless positioning, the device that is the object of the positioning may transmit the wireless signal multiple times and obtain an average value of position data of the device that is the object of the positioning obtained by the respective wireless signals.

In a third aspect of the present invention, there is provided a wireless positioning method using a target device that is an object of wireless positioning and has at least a wireless signal transmission module and a wireless reception module, a plurality of beacon devices each of which has at least a wireless signal transmission module, a wireless signal reception module and a counter module, and a processing unit, the method comprising the steps of (a) the plurality of beacon devices successively transmitting wireless signals, (b) the target device receiving the wireless signal transmitted from at least one of the plurality of beacon devices and then transmitting the wireless signal to the plurality of beacon devices, (c) the plurality of beacon devices receiving the wireless signals transmitted from the other beacon devices and the target device and sensing reception time points of the wireless signals after transmitting the wireless signals, and (d) the processing, unit obtaining the position of the target device by calculating distances between the plurality of beacon devices and the target device using information about reception time points of the wireless signals sensed by the respective beacon devices.

Preferably, the plurality of beacon devices include at least a first beacon device, a second beacon device and a third beacon device, and the step (a) comprises the sub-steps of the first beacon device transmitting a first wireless signal, the second beacon device transmitting a second wireless signal when a predetermined delay time elapses after the first wireless signal is received, and the third beacon device transmitting a third wireless signal when the predetermined delay time elapses after the second wireless signal is received.

Additionally, the step (c) comprises the sub-steps of the first beacon device receiving the second wireless signal, the third wireless signal and the wireless signal from the target device and sensing the respective reception time points thereof, the second beacon device receiving the third wireless signal and the wireless signal from the target device and sensing the respective reception time points thereof, and the third beacon device receiving the wireless signal from the target device and sensing the reception time point thereof.

In a fourth aspect of the present invention, there is provided a wireless positioning method which comprises the steps of (a) selecting two or more devices, the positions of which are previously known and which exist in a distance over which a wireless transmission/reception is possible, among a plurality of devices that are distributed in a specified area and that can transmit/receive wireless signals, (b) selecting another device, the position of which is to be known (i.e., which is an object of the positioning), among the plurality of devices, (c) the devices the positions of which are previously known successively transmitting the wireless signals, (d) the device that is the object of the positioning receiving the wireless signal transmitted from at least one of the devices the positions of which are previously known, and then transmitting the wireless signal to the devices the positions of which are previously known, and (e) the devices the positions of which are previously known receiving the wireless signals transmitted from the other devices the positions of which are previously known and the device which is the object of the positioning and sensing reception time points of the wireless signals after transmitting the wireless signals.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
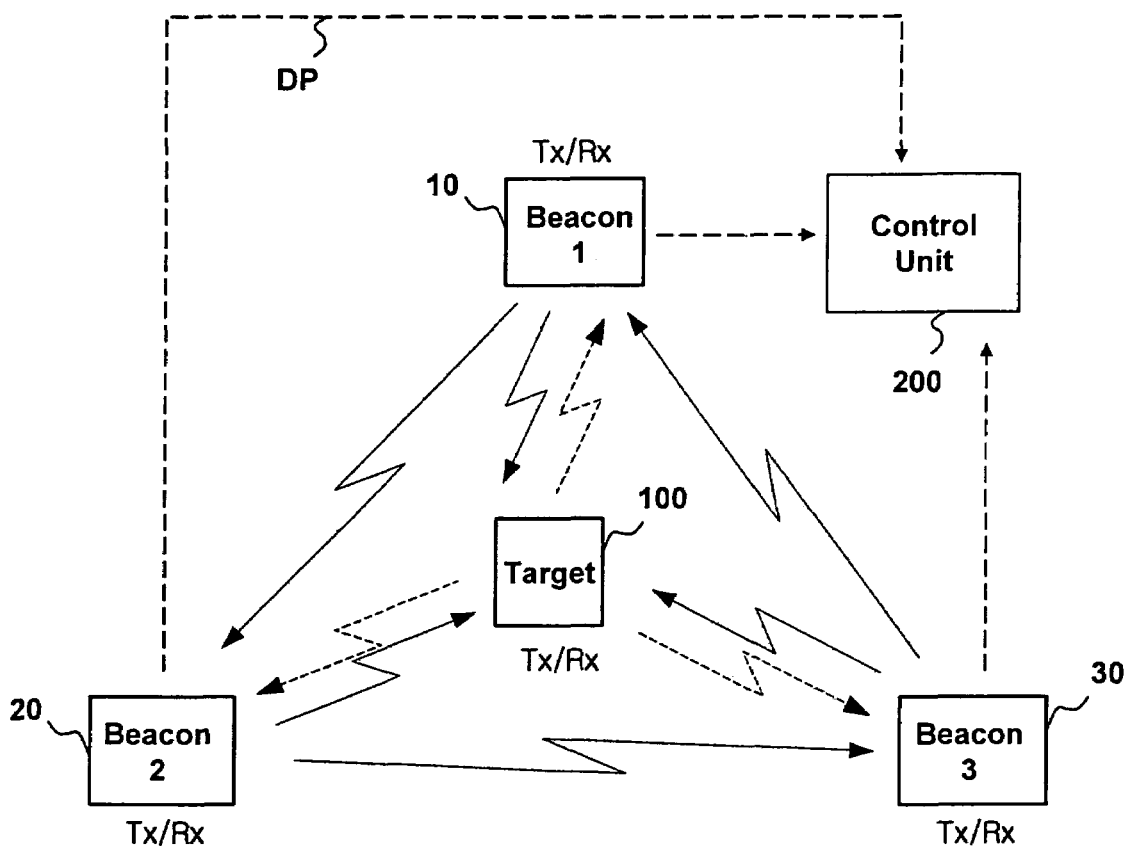
FIG. 1 is a schematic view illustrating a wireless positioning system according to the present invention.

Hereinafter, preferred embodiments of the present invention will be described with reference to the accompanying drawings. In the following description and drawings, the same reference numerals are used to designate the same or similar components, and so repetition of the description on the same or similar components will be omitted.

FIG. 1 is a schematic view illustrating a wireless positioning system according to the present invention. The system according to the present invention includes a plurality of beacon devices including a first beacon device 10, a second beacon device 20 and a third beacon device 30, a control unit 200 for receiving data from the beacon devices, and a target device (or tag) 100 that is an object of a position tracking. Here, wire data communication paths may not be provided among the beacon devices, and all data transmission/reception may be performed by wireless.

The control unit 200 refers to a main processing device that finally determines the position of the target device 100 by collecting and properly calculating ToA (Time of Arrival) and TDoA (Time Difference of Arrival) information from the respective beacon devices 10, 20 and 30.

The control unit 200 is communicable with the respective beacon devices 10, 20 and 30 by wire/wireless, but it is preferable for the control unit 200 to communicate with the beacon devices by wireless. In the control unit 200, necessary information such as the number of beacon devices, the signal transmission order, etc., can be stored. The control unit 200 may be an independent device or may be implemented in a body together with one of the beacon devices.

The beacon devices 10, 20 and 30 are fixed or mobile beacon devices having signal transmission/reception functions, and the respective beacon device once performs a signal transmission through an antenna in a wireless positioning process to be explained hereinafter. The positions of the respective beacon devices 10, 20 and 30 have already been known. The respective beacon device has a self-counter or timer, and can provide signal transmission/reception time information in the signal transmission/reception process.

In particular, the whole wireless positioning system can be implemented even if the second beacon device 20 and the third beacon device 30 have a simple analog relay function. This is because in the wireless positioning process as explained below, it is enough that the second and third beacon devices 20 and 30 passively proceed with an ordered transmission process after they receive the signal actively transmitted by the first beacon device 10.

The target device 100 is an object of the wireless positioning, and has a signal transmission/reception function. The target device once performs a signal transmission through a non-directional antenna in the wireless positioning process to be explained hereinafter. Because the target device is mostly constructed to have a sufficient mobility in diverse applications, it is preferable that it operates with low power consumption, and it may be constructed to have a reception function and a transmission power level that are simpler than those of the beacon device. Unlike the beacon devices 10, 20 and 30, the target device 100 does not have a fixed position, but has a self-timer for applying the timing set in the signal transmitting process.

Figure 2:
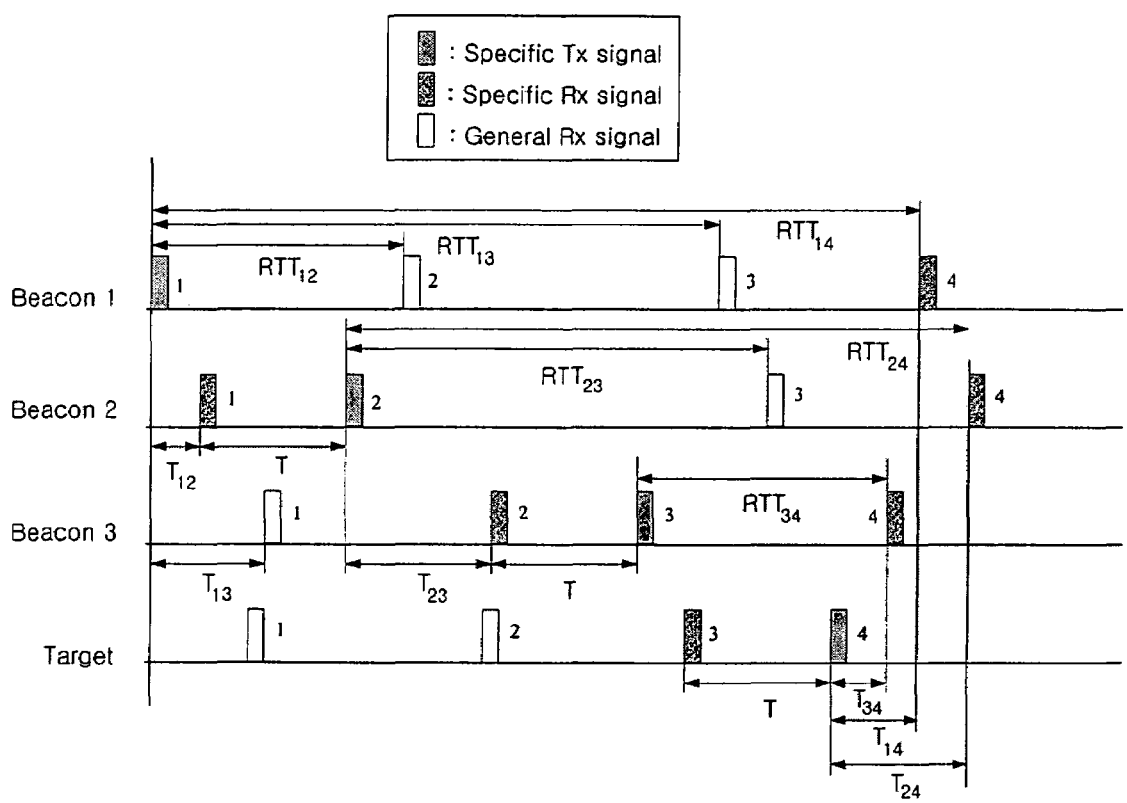
FIG. 2 is a view explaining the operation of the wireless positioning system according to an embodiment of the present invention.

FIG. 2 is a view explaining the operation of the wireless positioning system according to an embodiment of the present invention. In FIG. 2, transmitted/received signals and timing information of the respective beacon devices 10, 20 and 30 and the target device 100 during the operation of the system are illustrated.

The first beacon device 10 transmits a first wireless signal and operates the counter simultaneously. Here, the wireless signal may be an impulse signal that follows the UWB standard. The second beacon device 20 receives the first wireless signal transmitted by the first beacon device 10 after $T_{12}$ seconds and simultaneously judges whether the first wireless-signal is received with a proper level through an energy detection method, a detection method by a correlator, etc. In this case, if the level of the received signal is higher than a predetermined threshold level, the second beacon device operates a timer (or a counter). Additionally, after a predetermined delay time (e.g., T seconds), the second beacon device transmits a second wireless signal to the other beacon devices 10 and 30 and the target device 100.

The first beacon device 10, which has received the second wireless signal transmitted from the second beacon device 20, judges the reception of the transmitted second wireless signal if the second wireless signal is received with a proper level through the energy detection method, the detection method by the correlator, etc., and obtains RTT (Round Trip Time) information $RTT_{12}$ between the first beacon device 10 and the second beacon device 20 including the delay time (e.g., T seconds) using counter information at that time.

$$RTT_{12}=T+2T_{12} \quad (1)$$

Here, $T_{12}$ denotes the ToA (Time of Arrival) of the wireless signal between the first beacon device 10 and the second beacon device 20.

The first wireless signal transmitted by the first beacon device 10 is received in the third beacon device 30 after $T_{13}$ seconds. Thereafter, the second wireless signal transmitted from the second beacon device 20 is received in the third beacon device 30, and if the predetermined delay time T elapses after the time point at which the second wireless signal is received, the third beacon device 30 transmits a third wireless signal. The third wireless signal arrives at the second beacon device 20 and the first beacon device 10, respectively.

The second beacon device 20, which has received the third wireless signal transmitted from the third beacon device 30, judges the reception of the transmitted third wireless signal if the third wireless signal is received with the proper level through the energy detection method, the detection method by the correlator, etc., and obtains RTT (Round Trip Time) information $RTT_{23}$ between the second beacon device 20 and the third beacon device 30 including the delay time (e.g., T seconds) using the counter information at that time.

$$RTT_{23}=T+2T_{23} \quad (2)$$

Here, $T_{23}$ denotes the ToA (Time of Arrival) of the wireless signal between the second beacon device 20 and the third beacon device 30.

In the same manner, the first beacon device 10 obtains RTT (Round Trip Time) information $RTT_{13}$ between the first beacon device 10 and the third beacon device 30.

$$RTT_{13}=T_{12}+2T+T_{23}+T_{13} \quad (3)$$

Here, $T_{13}$ denotes the ToA (Time of Arrival) of the wireless signal between the first beacon device 10 and the third beacon device 30.

The third wireless signal transmitted from the third beacon device 30 arrives at the target device 100. The target device 100 transmits a fourth wireless signal to the other beacon devices 10, 20 and 30 after the predetermined delay time T elapses.

The third beacon device 30, which has received the fourth wireless signal, senses the reception time point of the fourth wireless signal, and obtains RTT (Round Trip Time) information $RTT_{34}$ between the third beacon device 30 and the target device 100 using the counter information at that time.

$$RTT_{34}=T_{34}+T+T_{34} \quad (4)$$

Here, $T_{34}$ denotes the ToA (Time of Arrival) of the wireless signal between the third beacon device 30 and the target device 100.

The second beacon device 20, which has received the fourth wireless signal, senses the reception time point of the fourth wireless signal, and obtains RTT (Round Trip Time) information $RTT_{24}$ between the second beacon device 20 and the target device 100 using the counter information at that time.

$$RTT_{24}=T_{23}+T+T_{34}+T+T_{24} \quad (5)$$

Here, $T_{24}$ denotes the ToA (Time of Arrival) of the wireless signal between the second beacon device 20 and the target device 100.

Additionally, the first beacon device 10, which has received the fourth wireless signal, senses the reception time point of the fourth wireless signal, and obtains RTT (Round Trip Time) information $RTT_{14}$ between the first beacon device 10 and the target device 100 using the counter information at that time.

$$RTT_{14}=T_{12}T+T_{23}T+T_{34}+T+T_{14} \quad (6)$$

Here, $T_{14}$ denotes the ToA (Time of Arrival) of the wireless signal between the first beacon device 10 and the target device 100.

Using the RTT (Round Trip Time) information obtained through the above-described process, the ToA information among the respective devices can be calculated and obtained as follows.

$$T_{12}=(RTT_{12}-T)/2 \quad (7)$$

$$T_{23}=(RTT_{23}-T)/2 \quad (8)$$

$$T_{13}=(RTT_{13}-T_{12}-T_{23}-2T) \quad (9)$$

$$TOA_{34}=(RTT_{34}-T)/2 \quad (10)$$

$$TOA_{24} = (RTT_{24} - T_{23} - TOA_{34} - 2T) \quad (11)$$

$$TOA_{14} = (RTT_{14} - T_{12} - T_{23} - TOA_{34} - 3T) \quad (12)$$

Using the above information, the TDoA (Time Difference of Arrival) information can be obtained as follows.

$$TDOA_{12} = TOA_{14} - TOA_{24} \quad (13)$$

$$TDOA_{23} = TOA_{24} - TOA_{34} \quad (14)$$

If the ToA information and the TDoA information are obtained as described above, the position of the target device 100 can be obtained by geometrical calculation using the ToA and TDoA information. For example, because the positions of the respective beacon devices 10, 20 and 30 are previously known, the position of the target device 100 can be obtained by obtaining an intersection among second-order curves around the positions of the beacon devices.

As described above, in the embodiment of the present invention, the position of the target device 100 is obtained through the once transmission by the respective beacon devices 10, 20 and 30 and target device 100. However, many modifications can be made in the detailed processes as described above. For example, the order or timing of the wireless signal transmissions from the respective beacon devices 10, 20 and 30 and the target device 100 may be changed, and for the obtaining of the corresponding ToA and TDoA information, it may diversely be changed which signal is to be used for the measurement of the ToA or what equation is to be used for the position calculation.

Meanwhile, in a modified embodiment of the present invention, the precision of the wireless positioning may be improved in a manner that the wireless signal transmitted from the target device is generated multiple times and the average value thereof is used to heighten the precision of the data. Additionally, the precision of the wireless positioning may be improved in a manner that the conditions of the respective wireless channels are monitored or estimated in the communication system, the number of repetitions of the wireless positioning process is set according to the wireless-channel conditions, and the average value thereof is obtained to heighten the precision of data.

If the wireless positioning system according to the present invention is, applied through the above-described process, once transmission of the tag signal is sufficient for the wireless positioning, and thus the transmission power consumption can be minimized without the necessity of synchronization. Accordingly, a high-precision wireless positioning that makes the sufficient use of the short pulse width of the UWB pulses becomes possible.

Figure 3:
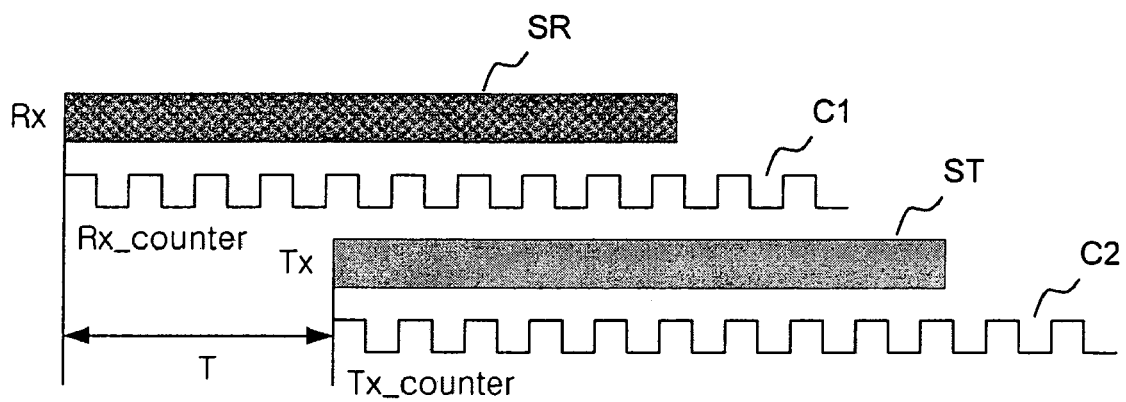
FIG. 3 is a view illustrating a delay time between a wireless signal received from another device and a transmitted signal in the wireless positioning system according to the present invention.

FIG. 3 is a view illustrating the delay time between the wireless signal received from another device and the transmitted signal in the wireless positioning system according to the present invention. The delay time is defined as a time difference between a transmitted signal ST and a received signal SR. For example, if the number of pulses counted by a reception counter Rx_counter reaches a predetermined value after a receiving end Rx received the received signal SR, the transmitted signal ST is transmitted through a transmitting end Tx, and a transmission counter Tx_counter is operated. In the case of the target device, the transmission counter Tx_counter is not necessarily required. The delay time T is set in consideration of the time required until the wireless signals from other positioning devices are received. It is preferable that the delay time includes the processing times of the respective devices, i.e., the time required until the respective devices decode the signals after detecting the energy of the signals, confirm whether the addresses of the signals coincide with each other, and then frame the signals.

FIGS. 4, 5, 6 and 7 are flowcharts illustrating processes performed by the first, second and third devices the positions of which are known and the device that is an object of the positioning (i.e., target device or tag) in the wireless positioning method according to the preferred embodiment of the present invention.

Figure 4:
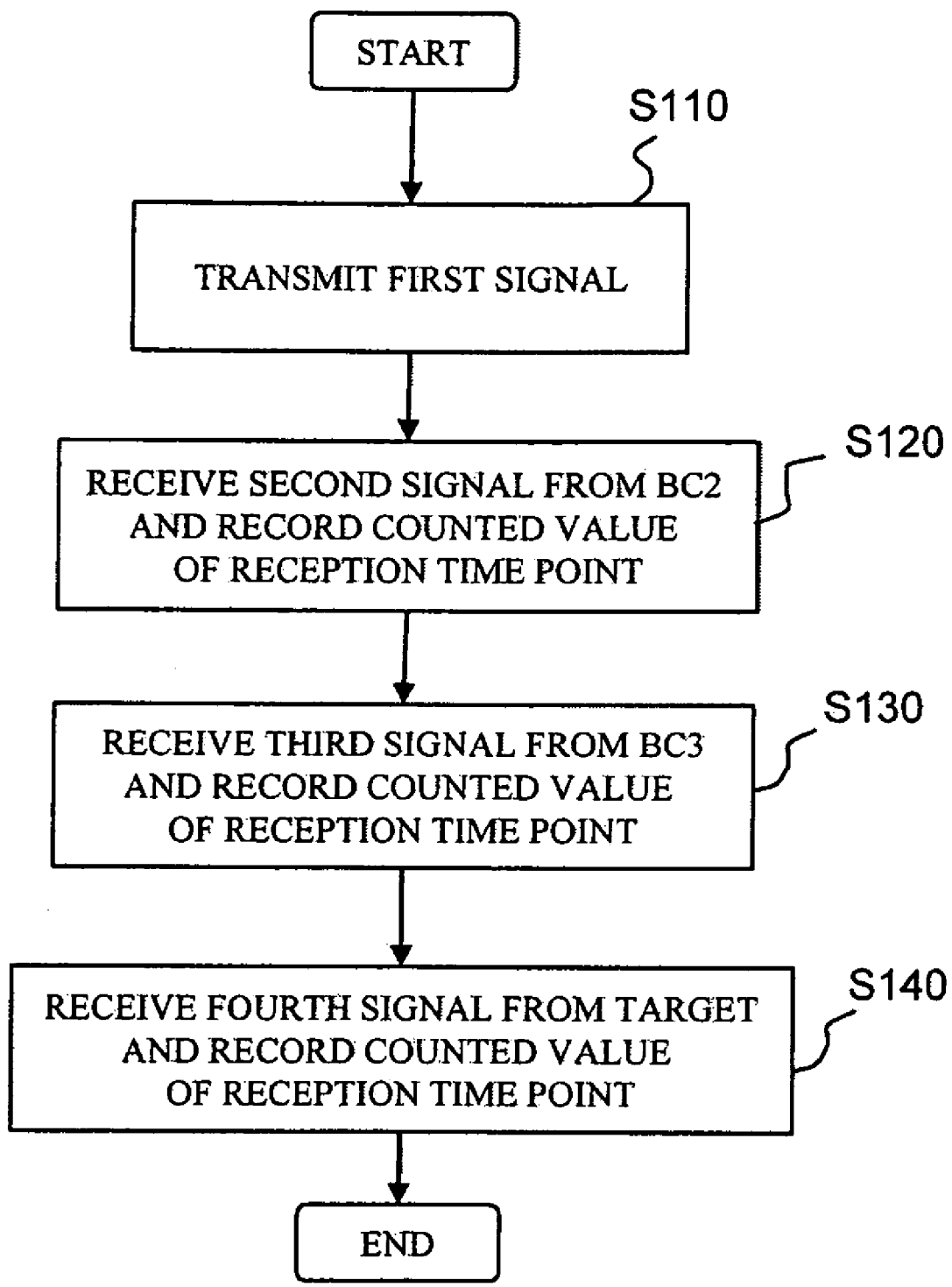
FIGS. 4, 5, 6 and 7 are flowcharts illustrating processes performed by first, second and third devices the positions of which are known and a device that is an object of the positioning in a wireless positioning method according to a preferred embodiment of the present invention.

The operation of the respective constituent element in the wireless positioning system will now be explained. FIG. 4 exemplifies the operation of the first beacon device 10.

S110: The first beacon device 10 transmits the first wireless signal to the second beacon device 20, the third beacon device 30 and the target device 100.

S120: Then, the first beacon device receives the second wireless signal from the second beacon device 20, and records the reception time point of the second wireless signal.

S130: Then, the first beacon device receives the third wireless signal from the third beacon device 30, and records the reception time point of the third wireless signal.

S140: Then, the first beacon device receives the fourth wireless signal from the target device 100, and records the reception time point of the fourth wireless signal.

Figure 5:
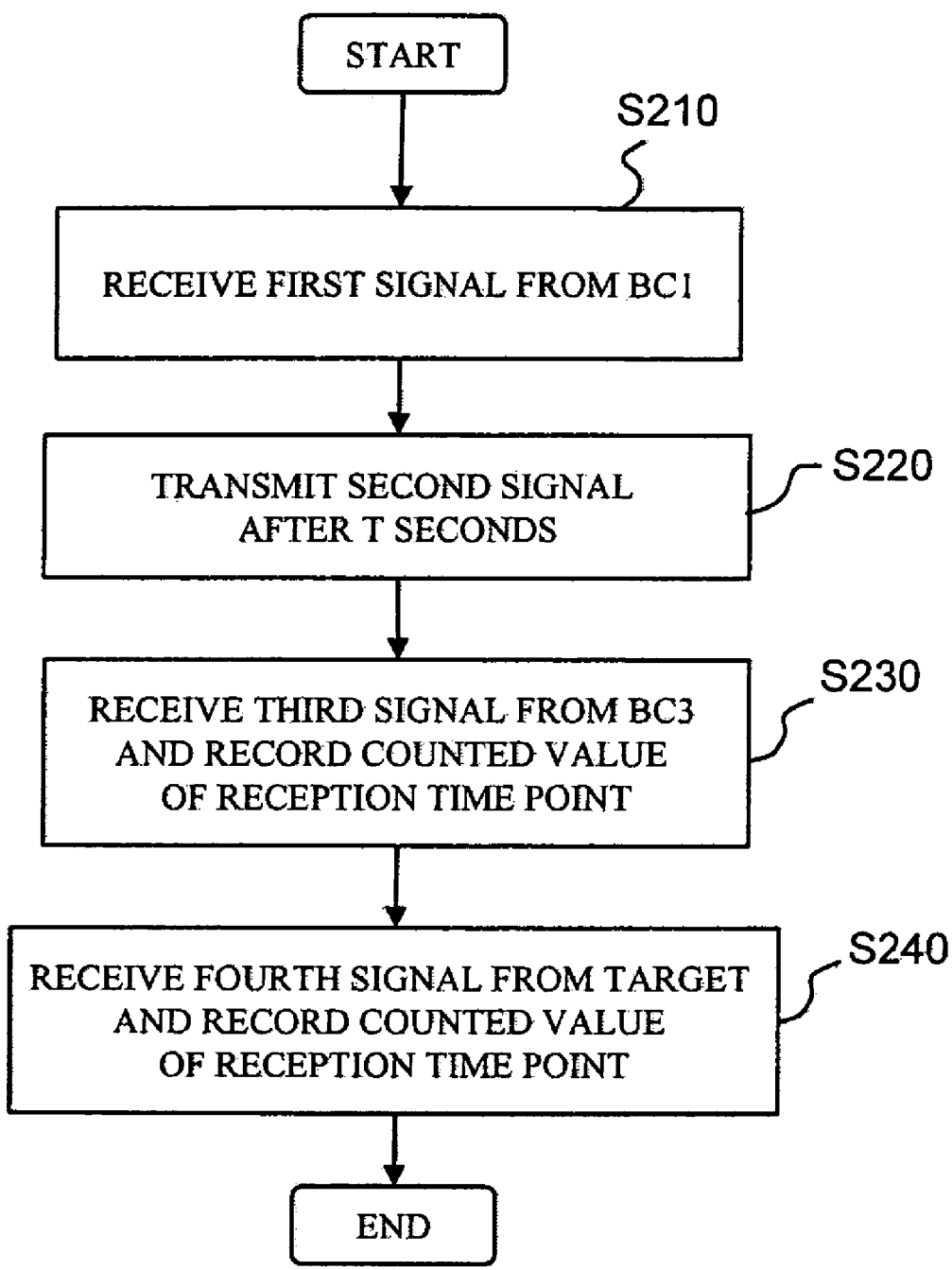

FIG. 5 exemplifies the operation of the second beacon device 20.

S210: The second beacon device 20 recognizes the first received wireless signal (i.e., the first wireless signal).

S220: Then, the second beacon device transmits the second wireless signal after the predetermined delay time T.

S230: Then, the second beacon device receives the third wireless signal transmitted from the third beacon device 30, and records the reception time point of the third wireless signal.

S240: Then, the second beacon device receives the fourth wireless signal from the target device 100, and records the reception time point of the fourth wireless signal.

Figure 6:
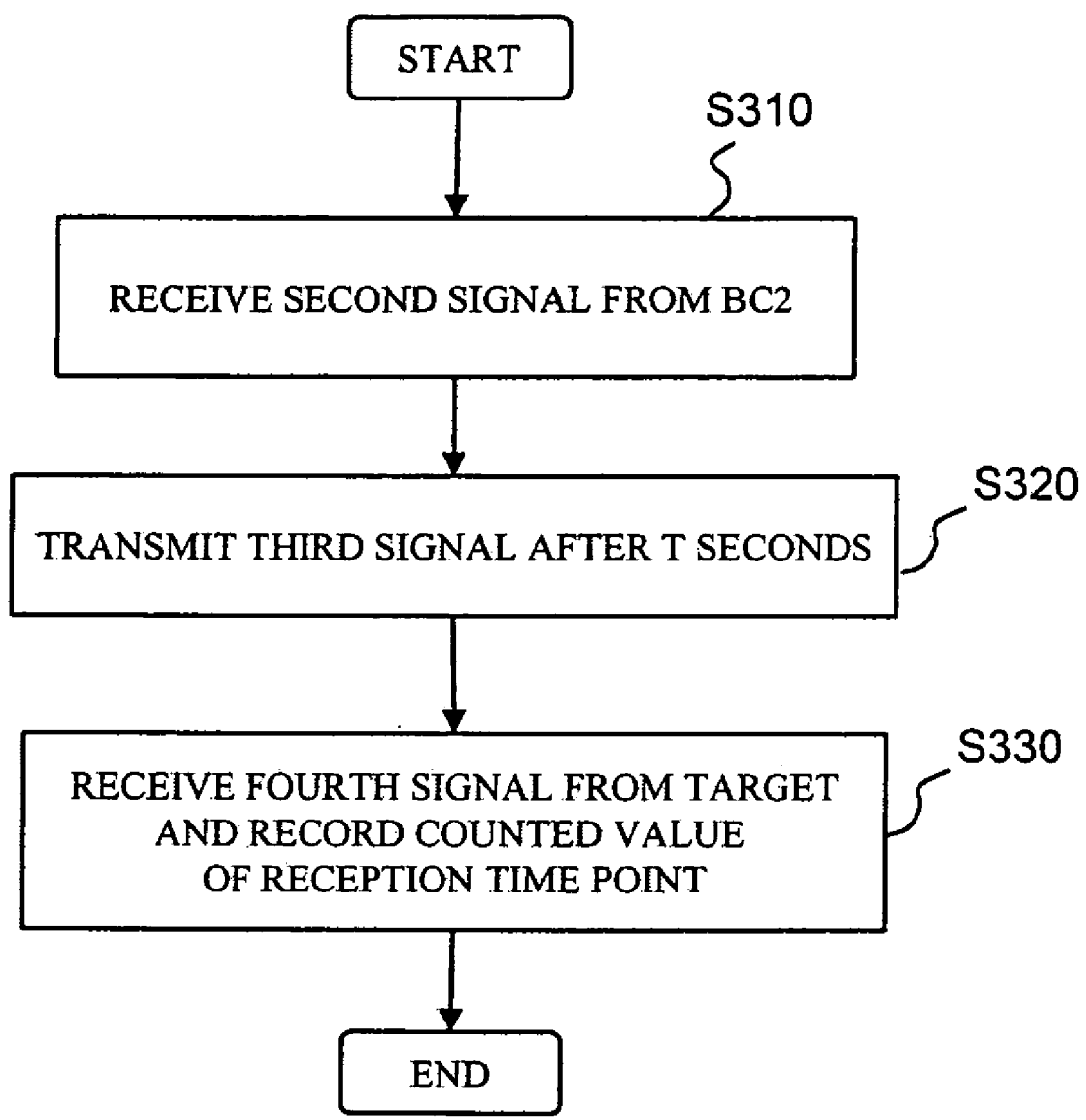

FIG. 6 exemplifies the operation of the third beacon device 30.

S310: The third beacon device 30 recognizes the second wireless signal transmitted from the second beacon device 20.

S320: Then, the third beacon device transmits the third wireless signal after the predetermined delay time T.

S330: Then, the third beacon device receives the fourth wireless signal transmitted from the target device 100, and records the reception time point of the fourth wireless signal.

Figure 7:
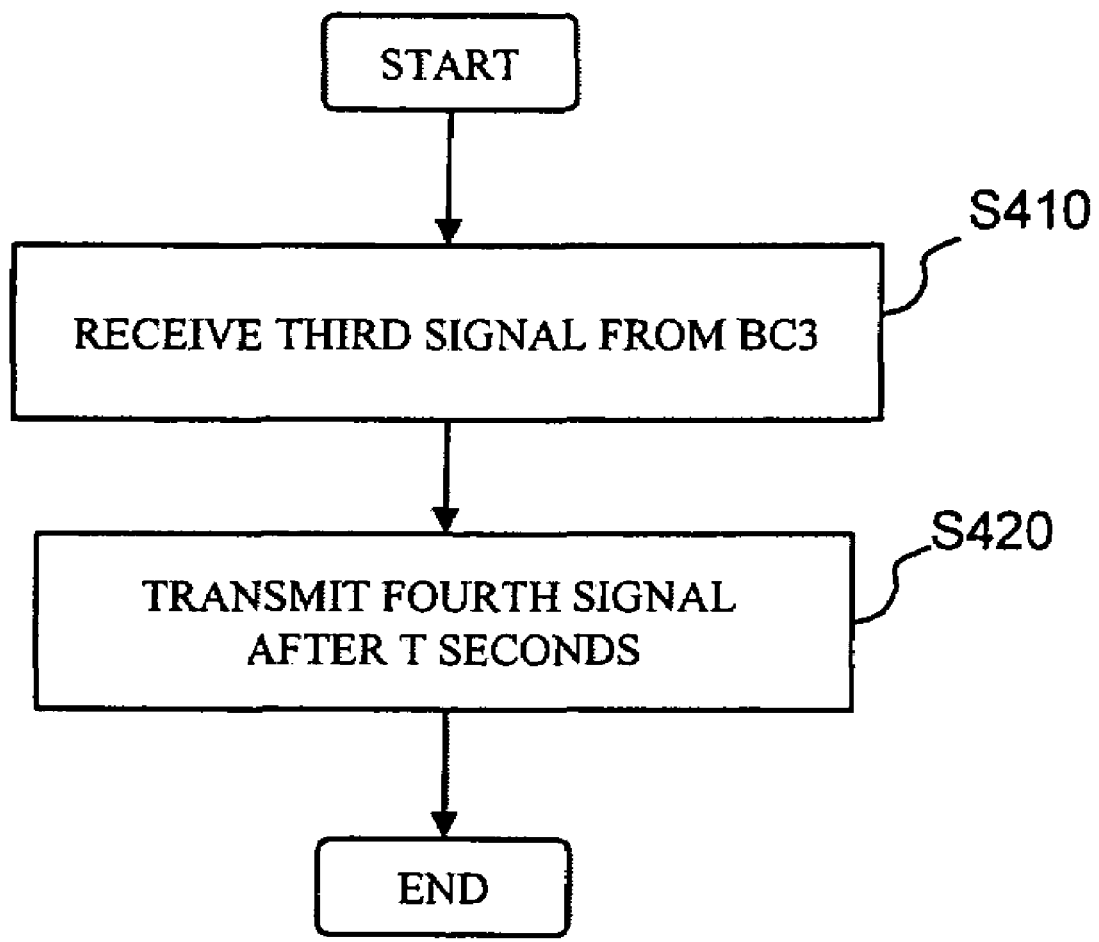

FIG. 7 exemplifies the operation of the target device 100.

S410: The target device 100 recognizes the third wireless signal transmitted from the third beacon device 30.

S420: Then, the target device transmits the fourth wireless signal after the predetermined delay time T.

Figure 8:
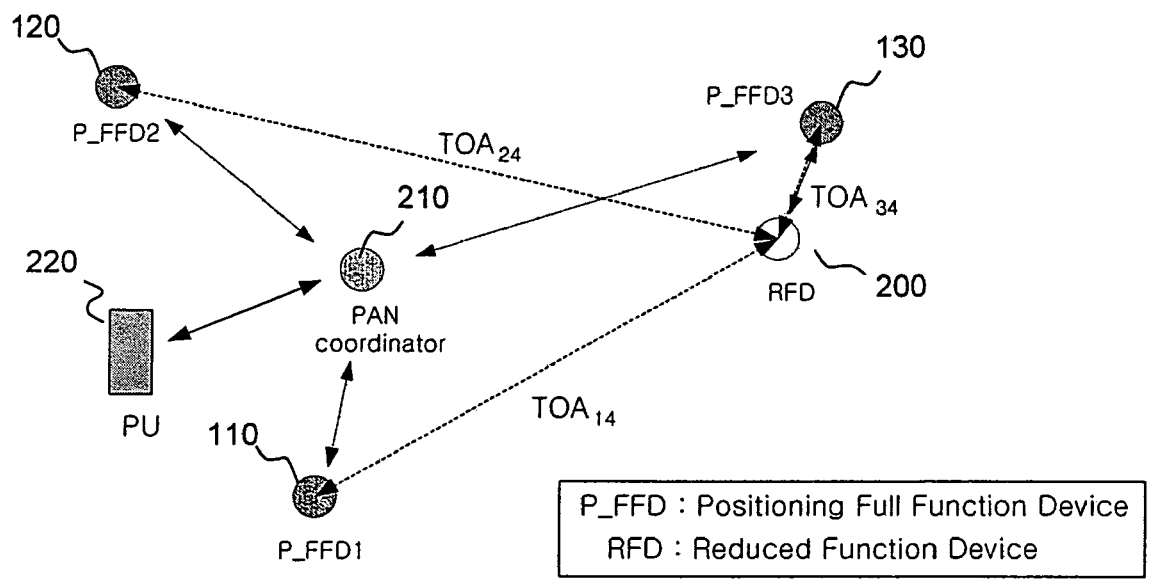
FIG. 8 is a schematic view illustrating the wireless positioning system according to another embodiment of the present invention.

FIG. 8 is a schematic view illustrating the wireless positioning system according to another embodiment of the present invention. In this embodiment of the present invention, the wireless positioning system according to the present invention is applied to a wireless network in which a plurality of devices that can perform the wireless transmission/reception are distributed in order to detect the position of a specified target device on the wireless network. Many devices have their own addresses for identifying themselves. The wireless positioning process is managed through a coordinator device 210. The coordinator device 210 is connected to a processing unit 220. The processing unit 220 serves to calculate the position of the device that is the object of the positioning (i.e., target device) using data of the reception time points recognized by the respective devices. The processing unit 220 is separated from the coordinator device 210 just in function, but may be constructed in a body together with the coordinator device. The coordinator device 210 is provided with a wireless transmission/reception module, and manages an address list of the devices that constitute the network.

Through the coordinator device, it is possible to obtain the positions of the devices that constitute the wireless network. That is, the position of a device 200 that is an object of the positioning is tracked through three devices 110, 120 and 130 the positions of which are previously known. While the position tracking is performed, the positions of the devices 110, 120 and 130 should be fixed in order to achieve an accurate position tracking. In this case, it is required for the devices 110, 120 and 130 the positions of which are previously known and the device 200 that is the object of the positioning to perform the wireless transmission/reception function. Generally, because the tag of the RFID and so on that is the object of the positioning is a device having only a simple function, it is indicated as an RFD (Reduced Function Device), and the device that is the basis of the position tracking on the network and has relatively many functions and resources is indicated as a P_FFD (Positioning Full Function Device). In order to know the position of the device that is the object of the positioning, as illustrated in FIG. 8, the ToA between the device 200 that is the object of the positioning and the devices 110, 120 and 130, the positions of which are known, should be known.

Figure 9:
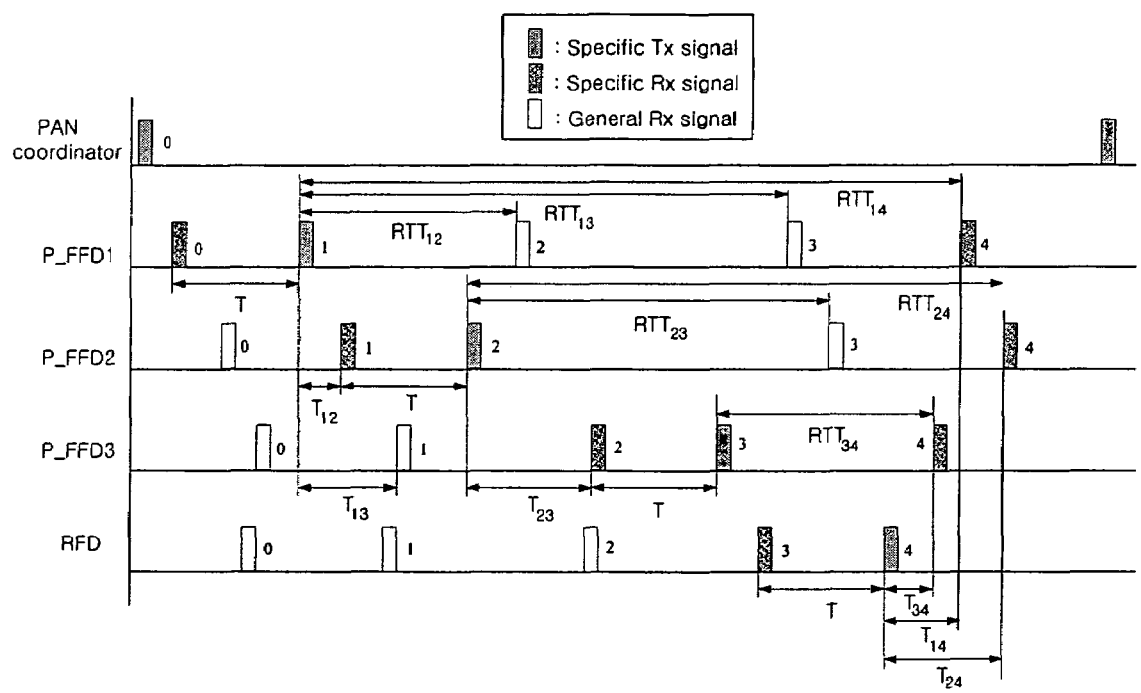
FIG. 9 is a view explaining the operation of the wireless positioning system according to another embodiment of the present invention.

FIG. 9 is a view explaining the operation of the wireless positioning system according to another embodiment of the present invention. The coordinator device 210, in order to obtain the position of the device that is the object of the positioning, selects the devices 110, 120 and 130 the positions of which are previously known on the network, obtains their addresses from the address list, and then transmits a reference wireless signal (0) to the devices 110, 120 and 130 the positions of which are previously known as illustrated in FIG. 9. Here, it is required that the device 200 which is the object of the positioning is located in an area in which a wireless transmission/reception is possible with the devices 110, 120 and 130 the positions of which are previously known, but it is not necessarily required that a wireless transmission/reception is possible with the coordinator device 210. The first device among the devices the positions of which are known receives the reference wireless signal (0), and transmits the first wireless signal after the predetermined delay time T. The following process is the same as that as described above with reference to FIG. 2.

Figure 10:
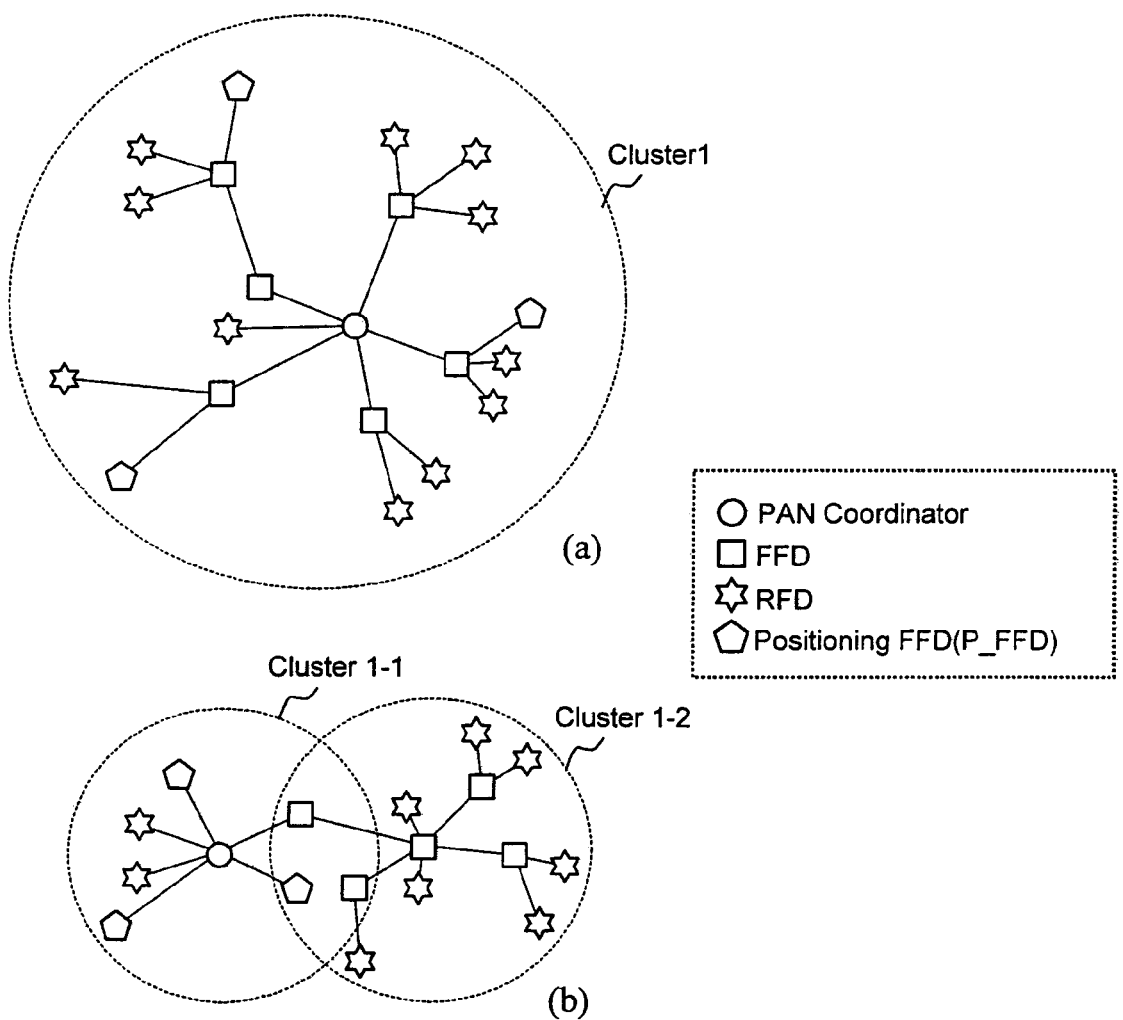
FIGS. 10a and 10b are views explaining a large-scaled cluster structure and a small-scaled sub-cluster structure to which the wireless positioning system according to the present invention is applied.

FIGS. 10*a* and 10*b* are views explaining a large-scaled cluster structure and a small-scaled sub-cluster structure to which the wireless positioning system according to the present invention is applied. In the case of applying the wireless positioning system according to the present invention to the large-scaled cluster structure, the respective devices should perform the wireless transmission/reception within a relatively wide range, and thus the power consumption is increased. Additionally, in order to prevent the data crosstalk, a data transmission mode and a wireless positioning mode should be discriminated from each other in the respective devices, and thus in the large-scaled cluster structure, the devices in the cluster should be in an inactive data transmission mode during the wireless positioning process. This causes the data transmission efficiency of the network to deteriorate.

In order to overcome this, as illustrated in FIG. 10*b*, it is possible to divide the large-scaled cluster of the wireless network into specified sub-clusters, and to perform a sequential positioning in each sub-cluster. For example, if the cluster is divided into a cluster 1-1 and a cluster 1-2, the coordinator device is located in the cluster 1-1 and can track the positions of the respective devices by performing the positioning in the cluster 1-1. The devices located in the overlapping part of the cluster 1-1 and the cluster 1-2 are devices which can perform a wireless transmission/reception with the coordinator device located in the cluster 1-1 and thus the positions of which can directly be known. The devices located in the overlapping part can also perform the wireless transmission/reception with the devices located in the cluster 1-2. Accordingly, it is possible to apply a positioning method by stages in a manner that the positions of the devices located in the overlapping part of the cluster 1-1 and the cluster 1-2 are first measured, and then the positions of the other devices located in the cluster 1-2 are measured using the devices located in the overlapping part as beacon devices.

According to the above-described wireless positioning method, the respective devices can perform the wireless transmission/reception within the relatively small sub-cluster, and thus the power consumption can be decreased. Additionally, it is possible to perform the positioning process in one sub-cluster while the data transmission/reception is performed in the other sub-cluster, and thus the data transmission efficiency of the network can be heightened.

Figure 11:
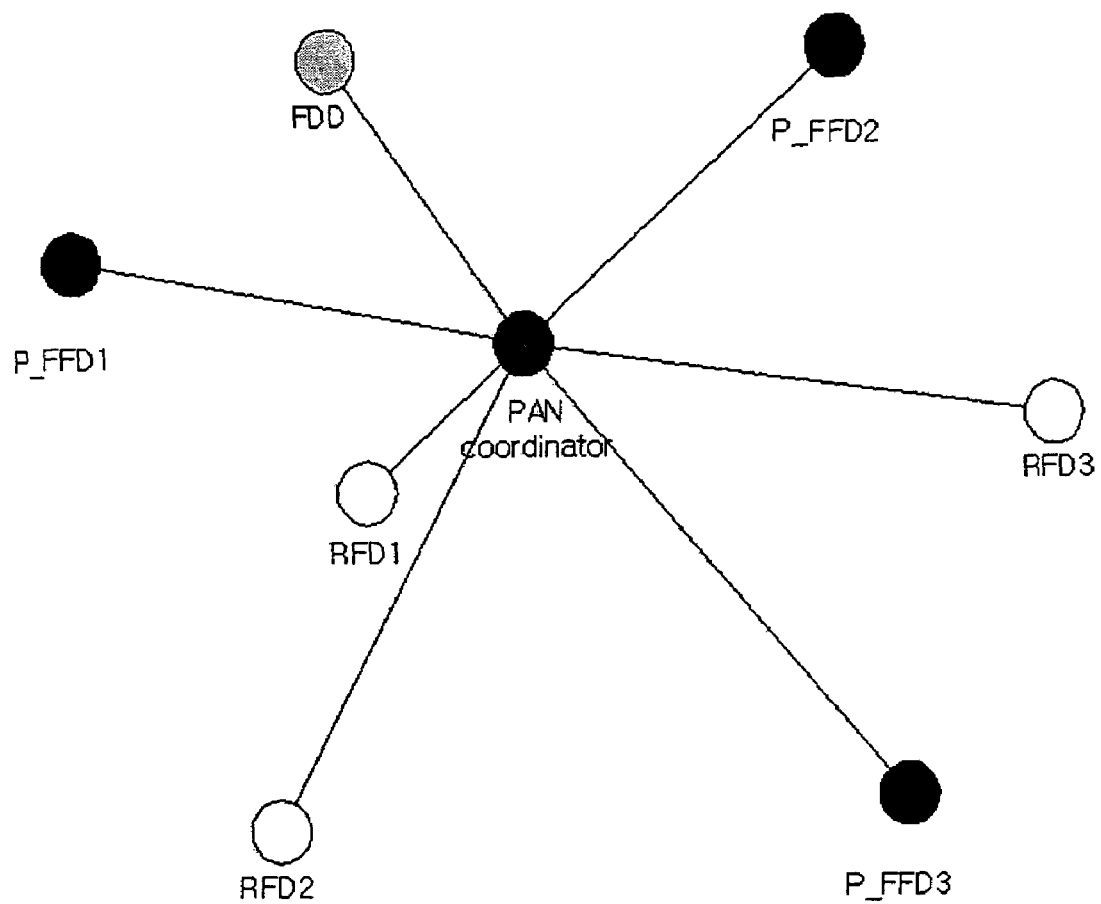
FIG. 11 is a view explaining a star network structure to which the wireless positioning system according to the present invention is applied.

FIG. 11 is a view explaining a star network structure to which the wireless positioning system according to the present invention is applied. In the star network structure, as illustrated in FIG. 11, the coordinator device performs the wireless transmission/reception directly with all the devices.

In this case, if it is intended to sequentially perform the positioning of the devices located in the cluster around the coordinator device, the coordinator sequentially selects the devices the positions of which are to be determined from the address list of the respective devices provided in the coordinator device, and then sequentially performs the positioning of the other devices using the devices P_FFD1, P_FFD2 and P_FFD3 the positions of which are previously known. If it is requested to perform the positioning of the devices using the device of a specified address as the target device, the coordinator includes the address of the target device in the wireless signal to be transmitted, and then performs the positioning of the devices through the following sequential process.

Figure 12:
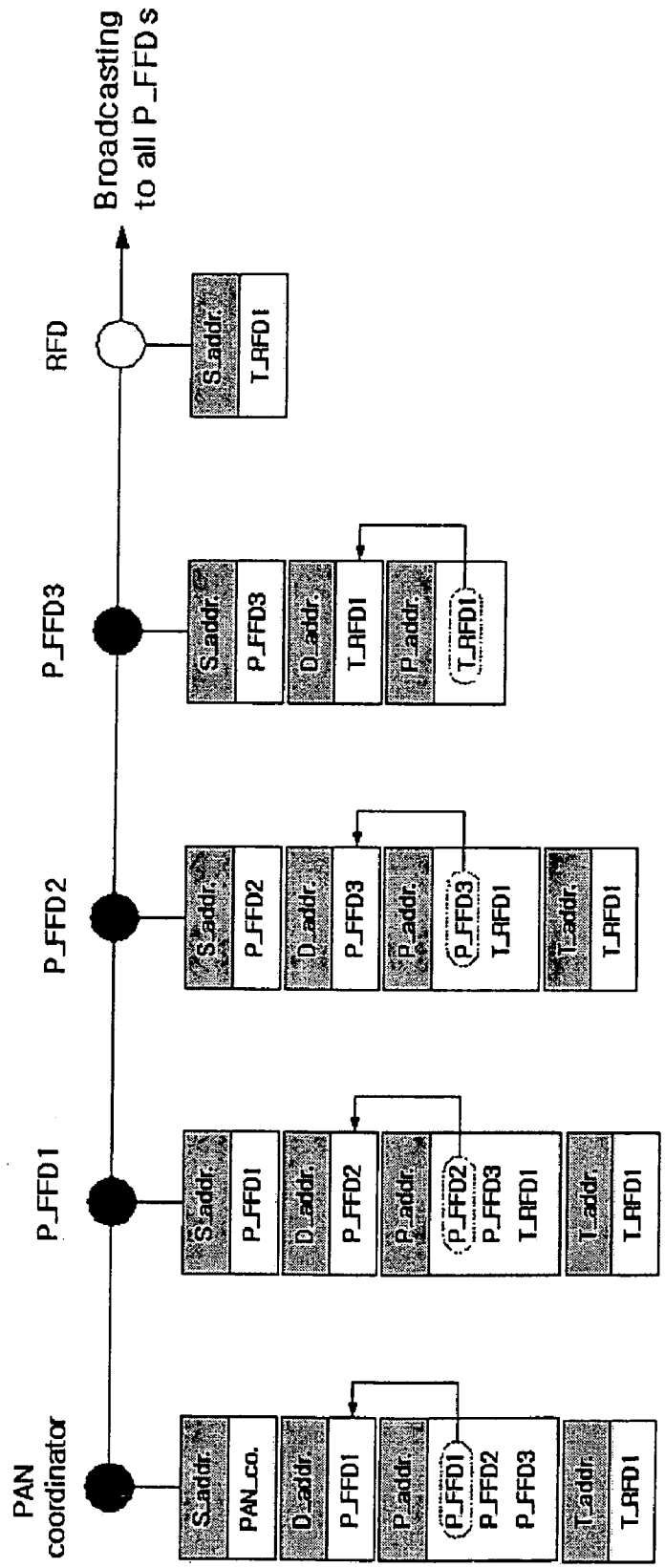
FIG. 12 is a view illustrating a signal transmitting process for a wireless positioning if the wireless positioning system according to the present invention is applied to the star network structure.

FIG. 12 is a view illustrating a signal transmitting process for the wireless positioning if the wireless positioning system according to the present invention is applied to the star network structure. As illustrated in FIG. 12, the coordinator carries the addresses P_addr. of the devices the positions of which are previously known and the address T_addr. of the device that is the object of the positioning on the wireless signal to be transmitted in the order of the wireless signal transmission. The addresses P_addr. of the devices the positions of which are previously known are in the order of the respective devices' wireless signal transmission. The coordinator device transmits the wireless signal to the first device P_FFD1 which is on the uppermost part of the list and the position of which is previously known.

The wireless signal may be formatted so as to include the address S_addr. of the device that transmits the signal, the address D_addr. of the device that will receive the signal, the address list P_addr. of the devices that will take part in the positioning by transmitting in order the signals and the address T_addr. of the device that is the object of the positioning. The respective devices can transmit the wireless signals including information as illustrated in FIG. 12 in the wireless positioning process.

Figure 13:
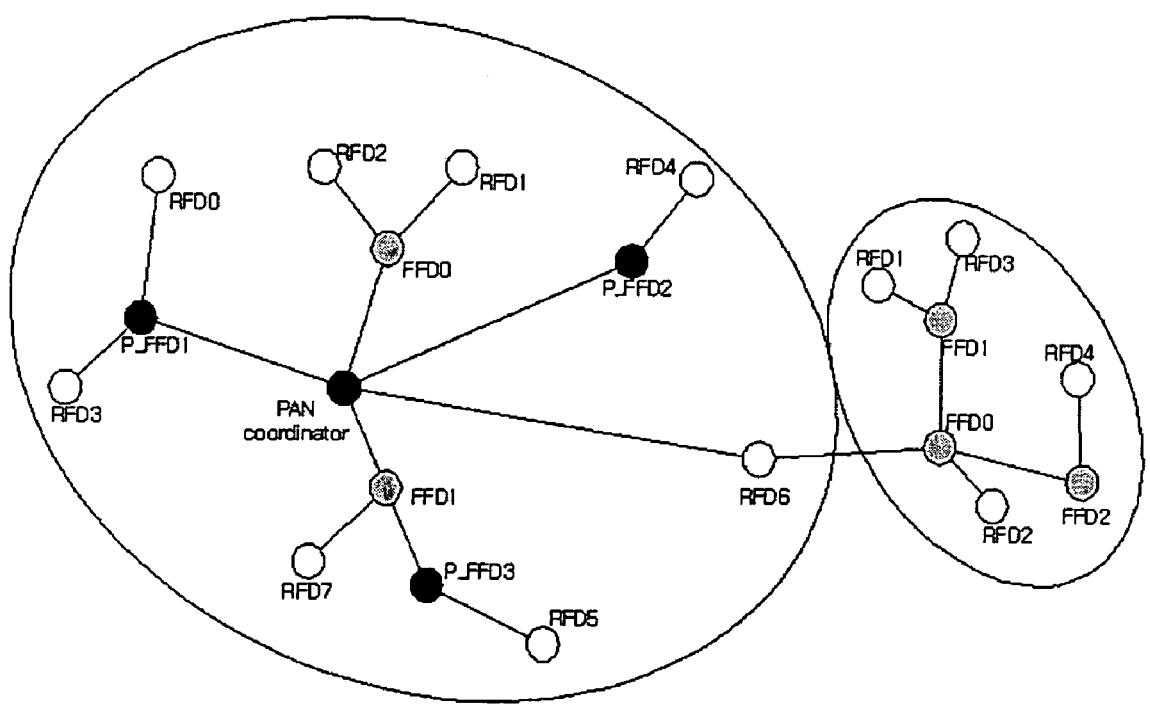
FIG. 13 is a view explaining a cluster-tree network structure to which the wireless positioning system according to the present invention is applied.

FIG. 13 is a view explaining a cluster-tree network structure to which the wireless positioning system according to the present invention is applied. In the cluster-tree network structure, as illustrated in FIG. 13, the coordinator device does not perform the wireless transmission/reception directly with all the devices, but constitutes a hierarchical network together with other devices.

In this case, if it is intended to sequentially perform the positioning of the devices located in the cluster around the coordinator device, the coordinator sequentially selects the devices the positions of which are to be determined from the address list of the respective devices provided in the coordinator device, and then sequentially performs the positioning of the other devices using the devices P_FFD1, P_FFD2 and P_FFD3 the positions of which are previously known.

If it is requested to perform the positioning of the devices using the device of a specified address as the target device, the coordinator includes the address of the target device in the wireless signal to be transmitted, and then performs the positioning of the devices through the following sequential process. In this case, unlike the star network structure illustrated in FIG. 12, the list of the devices, the positions of which are previously known, obtained from the address list provided in the coordinator should be re-arranged for the transmission of the wireless signal.

Figure 14:
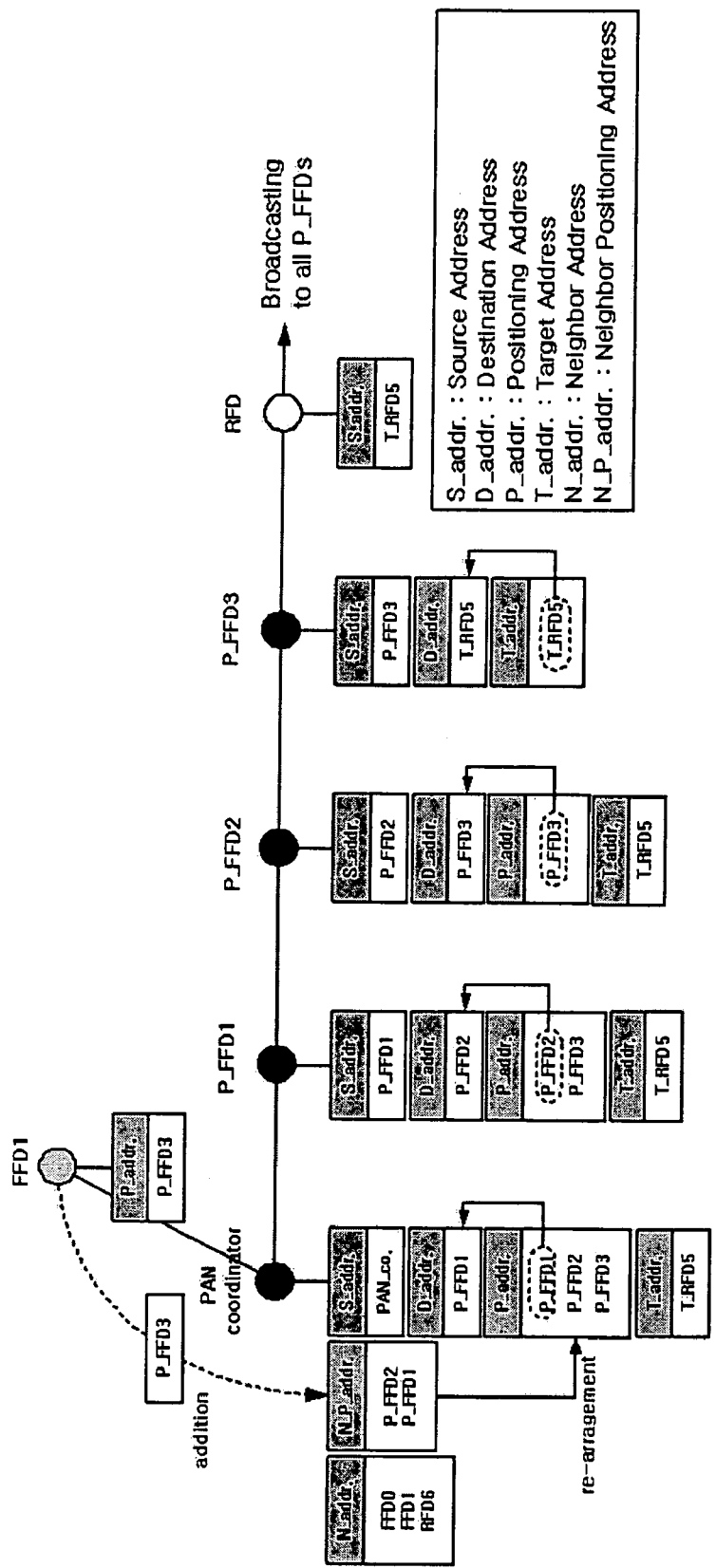
FIG. 14 is a view illustrating a signal transmitting process for a wireless positioning if the wireless positioning system according to the present invention is applied to the cluster-tree network structure.

FIG. 14 is a view illustrating a signal transmitting process for a wireless positioning if the wireless positioning system according to the present invention is applied to the cluster-tree network structure. For example, if the positioning of the device RFD5 in FIG. 13 is requested as the device that is the object of the positioning, the coordinator device confirms that the device RFD5 is not its neighbor device using the list N_addr. of its neighbor device, and then confirms the address of the device (for example, P_FFD3 in FIG. 13) which is adjacent to the device RFD5 and the position of which is previously known using the address list. Then, the coordinator device makes a list of addresses P_addr. of the devices the positions of which are previously known as illustrated in FIG. 14 by adding the address of the device P_FFD3, which is adjacent to the RFD and the position of which is known, into the lowermost part of the list N_P_addr. of the devices which are adjacent to the coordinator device and the positions of which are previously known, and then carries the address list on the wireless signal to be transmitted. The ordered wireless signal transmission will follow in the same manner as that described above with reference to FIG. 12.

The wireless positioning system and method according to the present invention may be modified and applied in diverse forms within the scope of the present invention, and is not limited to the preferred embodiments thereof as described above. It is apparent whether the constituent elements of the present invention are constructed in a body or in several divided parts is not an important factor in determining whether such construction departs from the scope of the present invention, but is a mere modification of the present invention.

In the embodiments of the present invention, the UWB pulses are mainly used as the wireless transmitted/received signals. However, the present invention is not limited thereto, but any general wireless signals such as successive signals that are not the UWB pulses may be used instead.

Additionally, in the embodiment of the present invention, it is exemplified that three beacon devices are used. However, it is also possible to use two beacon devices, and in this case, ToA information about the two beacon devices is obtained and circles or hyperboloids are obtained around the two beacon devices. By obtaining intersections between the circles or hyperboloids, the position of the tag can be obtained. Specifically, because the number of intersections between the circles or hyperboloids is 2, it should be determined which intersection between the two intersections corresponds to the actual position of the tag. The actual position of the tag is determined using data such as the strength of the wireless transmission power of the tag transmitted to the beacon device, the strength of the wireless transmission power transmitted from the beacon device to the tag, etc. Further, if four or more beacon devices are used in the present invention, the precision of the positioning can be sharpened. In this case, it is possible to perform the three-dimensional wireless positioning in which the height of the target device as well as the position thereof is considered.

As described above, if the wireless positioning system and method according to the present invention is applied, indirect time synchronization can be obtained from the asynchronous operation through ordered transmission of the beacon devices without the necessity of synchronization.

Additionally, the beacon devices transmit in order the wireless signals through the non-directional antenna in the allocated order, and these transmitted wireless signals are received by the remaining beacon devices and the tag. After the tag receives the ordered transmission of the wireless signals from all the beacon devices in the system, it finally transmits the wireless signal only once. Because the respective beacon devices and the tag transmit the wireless signals after a predetermined processing time, the RTT (Round Trip Time) can be measured for all cases, and based on this, the ToA or TDoA information can be obtained with the indirect synchronization.

Additionally, by applying the present invention, the number of tag signal transmission is minimized to achieve a low-power operation.

If the present invention is applied to the construction of a high-precision wireless positioning system based on the high time resolution of the UWB pulse signal, the synchronization problems of the beacon devices and the power consumption problems of the tag can be solved. Accordingly, it is expected that the present invention can advance the practical use of the short-distance wireless positioning systems and can be used in diverse application fields for future ubiquitous environments.

According to the present invention, a high-precision position tracking can be achieved by minimizing errors through the proposed method for accurately obtaining indirect time synchronization without the necessity of time synchronization. In particular, in applying the present invention, the use of UWB pulses as wireless signals enables a high-precision position tracking that makes the best use of the advantages of the UWB pulses.

According to the present invention, it is possible to use a target device of a simple structure without the necessity of a complicated operation process in the target device and to perform a low-power operation through simplification of the construction of the target device and minimization of the number of signal transmissions, and thus a precise position tracking can be achieved.

Additionally, according to the present invention, a more accurate positioning can be performed by the detection of the ToA (Time of Arrival) and the TDoA (Time Difference of Arrival) through the pulse transmission/reception even if the synchronization among beacon devices is not provided and the accurate distance information about the wave propagation paths is not known.

Additionally, according to the present invention, it is possible to provide a wireless positioning system and method that can be applied to the networks of a star structure and a cluster-tree structure.

Further, according to the present invention, an accurate positioning can be achieved even by low-power devices by dividing the whole system into small-scale sub-cluster areas and performing a wireless positioning using the devices existing in overlapping areas among the respective sub-cluster areas so that an asynchronous wireless positioning using the low-power devices becomes possible.

Moreover, according to the present invention, a scheme for efficiently managing addresses of a target device and beacon devices in a transmitted signal is provided to match diverse positioning modes so that the present invention can be applied to the WPAN (Wireless Personal Area Network) technology.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A wireless positioning system comprising:
   a target device that is an object of wireless positioning, a plurality of beacon devices and a processing unit;
   (a) each of the beacon devices having at least a wireless signal transmission module, a wireless signal reception module and a counter module, wherein each of the beacon devices is configured to transmit a wireless signal using the wireless signal transmission module, and configured to sense reception time points of wireless signals that are transmitted from the other beacon devices and the target device and received at time points after the transmission of the wireless signal using the counter module;
   (b) the target device having at least a wireless signal transmission module and a wireless reception module, wherein the target device is configured to transmit the wireless signal to the plurality of beacon devices after ordered transmissions of the wireless signals by all of the plurality of beacon devices; and
   (c) the processing unit is configured to obtain the position of the target device by calculating distances between the plurality of beacon devices and the target device is configured to use information about reception time points of the wireless signals according to the ordered transmissions and the wireless signal transmitted by the target device, sensed by the respective beacon devices.

2. The wireless positioning system as claimed in claim 1, wherein the plurality of beacon devices include at least a first beacon device for transmitting a first wireless signal and a second beacon device for transmitting a second wireless signal when a predetermined delay time elapses after the first wireless signal is received.

3. The wireless positioning system as claimed in claim 2, wherein the plurality of beacon devices further include a third beacon device for transmitting a third wireless signal when the predetermined delay time elapses after the second wireless signal is received.

4. The wireless positioning system as claimed in claim 3, wherein the target device transmits a fourth wireless signal when the predetermined delay time elapses after the third wireless signal is received.

5. The wireless positioning system as claimed in claim 4, wherein the first beacon device senses the reception time points of the second wireless signal, the third wireless signal and the fourth wireless signal.

6. The wireless positioning system as claimed in claim 5, wherein the second beacon device senses the reception time points of the third wireless signal and the fourth wireless signal.

7. The wireless positioning system as claimed in claim 6, wherein the third beacon device senses the reception time point of the fourth wireless signal.

8. The wireless positioning system as claimed in claim 2, wherein the predetermined delay time is a time enough for the reception of the received wireless signal through all the other beacon devices.

9. The wireless positioning system as claimed in claim 1, further comprising a coordinator device that manages an address list for identifying the plurality of beacon devices, transmits a reference wireless signal for requesting the wireless positioning to at least one of the plurality of beacon devices, receives and transmits the information about the reception time points of the wireless signals sensed by the plurality of beacon devices to the processing unit.

10. A wireless positioning method using a target device that is an object of wireless positioning and has at least a wireless signal transmission module and a wireless reception module, a plurality of beacon devices each of which has at least a wireless signal transmission module, a wireless signal reception module and a counter module, and a processing unit, the method comprising the steps of:
   (a) the plurality of beacon devices transmitting wireless signals in order;
   (b) the target device transmitting the wireless signal to the plurality of beacon devices after ordered transmission of the wireless signals by all of the plurality of beacon devices;
   (c) each of the plurality of beacon devices receiving the wireless signal according to the ordered transmissions and the wireless signal transmitted by the target device and sensing reception time points of the wireless signals; and
   (d) the processing unit obtaining the position of the target device by calculating distances between the plurality of beacon devices and the target device using information about the reception time points of the wireless signals sensed by the respective beacon devices.

11. The wireless positioning method as claimed in claim 10, wherein the plurality of beacon devices include at least a first beacon device, a second beacon device and a third beacon device; and
   the step (a) comprises the sub-steps of:
   the first beacon device transmitting a first wireless signal;
   the second beacon device transmitting a second wireless signal when a predetermined delay time elapses after the first wireless signal is received; and
   the third beacon device transmitting a third wireless signal when the predetermined delay time elapses after the second wireless signal is received.

12. The wireless positioning method as claimed in claim 11, wherein the step (c) comprises the sub-steps of:
   the first beacon device receiving the second wireless signal, the third wireless signal and the wireless signal from the target device and sensing the respective reception time points thereof;
   the second beacon device receiving the third wireless signal and the wireless signal from the target device and sensing the respective reception time points thereof; and
   the third beacon device receiving the wireless signal from the target device and sensing the reception time point thereof.

* * * * *

UNITED STATES PATENT AND TRADEMARK OFFICE
CERTIFICATE OF CORRECTION

| | | |
|---|---|---|
| PATENT NO. | : 7,411,551 B2 | Page 1 of 1 |
| APPLICATION NO. | : 11/025821 | |
| DATED | : August 12, 2008 | |
| INVENTOR(S) | : Choi et al. | |

It is certified that error appears in the above-identified patent and that said Letters Patent is hereby corrected as shown below:

<u>Face of the Patent</u>, See Item (56) References Cited, U.S. PATENT DOCUMENTS, add the following U.S. patent:

-- 3,409,889    07/1966    Graham --

Signed and Sealed this

Twenty-third Day of December, 2008

JON W. DUDAS
*Director of the United States Patent and Trademark Office*